No. 869,546. PATENTED OCT. 29, 1907.
J. B. L. BROWN.
CHECKREIN HOOK.
APPLICATION FILED OCT. 11, 1906.

Witnesses

Inventor
James B. L. Brown,
By
Attorney

UNITED STATES PATENT OFFICE.

JAMES B. L. BROWN, OF GALENA, KANSAS.

CHECKREIN-HOOK.

No. 869,546.  Specification of Letters Patent.  Patented Oct. 29, 1907.

Application filed October 11, 1906. Serial No. 338,360.

*To all whom it may concern:*

Be it known that I, JAMES B. L. BROWN, a citizen of the United States, residing at Galena, in the county of Cherokee and State of Kansas, have invented new and useful Improvements in Checkrein-Hooks, of which the following is a specification.

The invention relates to an improvement in check rein hooks, involving particularly a means for preventing the accidental escape of the check rein ring therefrom.

The main object of the present invention is the provision of simple means arranged to prevent the escape of the check rein ring from the hook, said means being arranged to afford an easy and convenient engagement of the ring with the hook when desired.

The invention will be described in the following specification, reference being had to the accompanying drawings, in which:—

Figure 1:
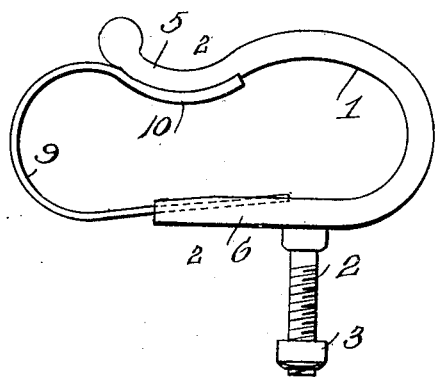
Figure 2:
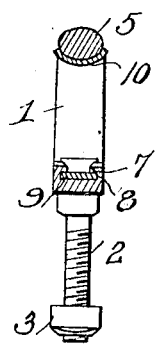

Figure 1 is a view in side elevation of a check rein hook constructed in accordance with my invention, Fig. 2 is a section of the same on line 2—2 of Fig. 1.

Referring to the drawings my improvement comprises a check rein hook 1, which aside from the details hereinafter noted may be of any usual or preferred construction. The lower or base portion of the hook is provided with a threaded bolt 2 for passage through the saddle bar, the hook being secured in place by a nut 3, all of which parts are of usual construction. The free terminal 5 of the hook proper is preferably curved in longitudinal section and of approximately oval configuration in transverse section, and the base of the hook is formed with an extension 6 projecting rearwardly from the hook body at its juncture with the bolt 2.

The extension 6 is formed in its relatively upper surface with a recess or groove 7, which extends longitudinally of the extension with the lower wall inclined forwardly and upwardly from the free end of the extension. The extent of inclination of the bottom wall of the groove is such that the forward portion of said bottom wall is coincident with the relatively upper surface of the base portion of the hook. The side walls of the groove, throughout their length are undercut, as at 8, for a purpose which will presently appear.

The hook is provided with a retaining member 9, comprising a desired length of spring material, as shown. The strip of spring material 9 is of a width corresponding to the distance between the side walls of the undercut portion of the groove 7, said spring being held in place by being inserted within the groove 7, and in the undercut portion thereof, as shown, whereby the spring is securely retained in place in a manner to permit its convenient removal when desired for the insertion of a new spring.

The spring strip is of a length to form a rounded or curved portion in rear of the free terminal of the hook, the relatively forward and upper terminal of the spring strip contacting with the relatively under surface of the hook terminal 5. The hook contacting portion 10 of the spring strip, is formed in longitudinal and transverse section to snugly embrace the hook terminal 5, thereby retaining the free end of the spring strip in engagement with said hook terminal against accidental displacement, and also preventing any jarring or rattling of the parts in use.

The ring of the check rein is readily engaged with the hook in an obvious manner, the spring strip yielding to permit passage of the ring. When in place accidental escape of the ring is prevented, as the spring strip together with the hook forms in effect a closed loop within which the ring is retained.

Having thus described the invention what is claimed as new, is:—

The combination with a check rein hook, of a spring retaining member to close the hook opening, means for securing one end of said member to the hook, the free end of said member contacting with the free end of the hook, the contacting portion of the member curving longitudinally and transversely to conform to the curvature of the engaged portion of the hook.

In testimony whereof, I affix my signature in presence of two witnesses.

JAMES B. L. BROWN.

Witnesses:
R. A. COLES,
H. E. MOORE.